US012476043B2

(12) United States Patent
Kim et al.

(10) Patent No.: US 12,476,043 B2
(45) Date of Patent: Nov. 18, 2025

(54) COIL COMPONENT

(71) Applicant: SAMSUNG ELECTRO-MECHANICS CO., LTD., Suwon-si (KR)

(72) Inventors: Han Kyeol Kim, Suwon-si (KR); Sung Hee Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 739 days.

(21) Appl. No.: 17/313,313

(22) Filed: May 6, 2021

(65) Prior Publication Data

US 2022/0208442 A1 Jun. 30, 2022

(30) Foreign Application Priority Data

Dec. 24, 2020 (KR) ........................ 10-2020-0183580

(51) Int. Cl.
*H01F 27/33* (2006.01)
*H01F 5/00* (2006.01)
(Continued)

(52) U.S. Cl.
CPC ............ *H01F 27/33* (2013.01); *H01F 5/003* (2013.01); *H01F 17/0006* (2013.01);
(Continued)

(58) Field of Classification Search
CPC ................ H01F 27/33; H01F 17/0013; H01F 2027/2809; H01F 17/0006; H01F 27/2804;
(Continued)

(56) References Cited

U.S. PATENT DOCUMENTS 7,656,262 B2 2/2010 Muto
2008/0197963 A1* 8/2008 Muto ................. H01F 17/0013 336/200
(Continued)

FOREIGN PATENT DOCUMENTS

JP 2005-294445 A 10/2005
JP 2008-198929 A 8/2008
(Continued)

OTHER PUBLICATIONS

Office Action issued in corresponding Korean Patent Application No. 10-2020-0183580 issued May 2, 2025, with English translation.

*Primary Examiner* — Tszfung J Chan
(74) *Attorney, Agent, or Firm* — MORGAN, LEWIS & BOCKIUS LLP

(57) ABSTRACT

A coil component includes a body, a support substrate disposed within the body, a coil unit disposed on the support substrate, a noise removal unit disposed to be spaced apart from the coil unit within the body and having an end exposed to one side surface of the body, first and second external electrodes disposed to be spaced apart from each other at the body and connected to both ends of the coil unit, and a third external electrode disposed to be spaced apart from each of the first and second external electrodes within the body and connected to the noise removal unit, wherein the noise removal unit includes a wall portion disposed outside of an outermost side turn of the coil unit at the support substrate and surrounding the outermost side turn of the coil unit and a cover portion disposed on the coil unit.

17 Claims, 6 Drawing Sheets

(51) Int. Cl.

| | |
|---|---|
| ***H01F 17/00*** | (2006.01) |
| ***H01F 27/28*** | (2006.01) |
| ***H01F 27/29*** | (2006.01) |
| ***H01F 27/32*** | (2006.01) |
| ***H01F 41/04*** | (2006.01) |
| ***H01F 41/12*** | (2006.01) |

(52) U.S. Cl.
CPC ......... *H01F 27/2804* (2013.01); *H01F 27/29* (2013.01); *H01F 27/323* (2013.01); *H01F 41/041* (2013.01); *H01F 41/122* (2013.01); *H01F 2027/2809* (2013.01)

(58) Field of Classification Search
CPC ........ H01F 5/003; H01F 27/29; H01F 27/292; H01F 27/323
USPC .................................................. 336/200, 232
See application file for complete search history.

(56) References Cited

U.S. PATENT DOCUMENTS

| | | | | |
|---|---|---|---|---|
| 2011/0248380 | A1* | 10/2011 | Yoshihara | H05K 1/165<br>257/E29.325 |
| 2013/0200982 | A1* | 8/2013 | Adachi | H01F 27/289<br>336/84 R |
| 2017/0063322 | A1* | 3/2017 | Matsunaga | H01F 27/292 |
| 2018/0238936 | A1* | 8/2018 | Park | H01F 27/292 |
| 2022/0115178 | A1* | 4/2022 | Yang | H01F 17/0013 |

FOREIGN PATENT DOCUMENTS

| | | | | |
|---|---|---|---|---|
| KR | 10-0344626 | B1 | 7/2002 | |
| KR | 10-2013-0046254 | A | 5/2013 | |
| KR | 10-2017-0026135 | A | 3/2017 | |
| KR | 2019135132 | A * | 12/2019 | H01F 17/04 |

* cited by examiner

COIL COMPONENT

CROSS-REFERENCE TO RELATED APPLICATION

This application claims the benefit of priority to Korean Patent Application No. 10-2020-0183580 filed on Dec. 24, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in electronic devices along with a resistor and a capacitor.

As electronic devices have increasingly had higher performance and have become compact, a larger number of electronic components are used in electronic devices and electronic components and are reduced in size.

For these reasons, there is increasing demand for removing noise such as electromagnetic interference (EMI) of coil components.

SUMMARY

An aspect of the present disclosure may provide a coil component in which noise is easily removed.

According to an aspect of the present disclosure, a coil component may include: a body; a support substrate disposed within the body; a coil unit disposed on the support substrate; a noise removal unit disposed to be spaced apart from the coil unit within the body and having an end exposed to one side surface of the body; first and second external electrodes disposed to be spaced apart from each other at the body and connected to both ends of the coil unit; and a third external electrode disposed to be spaced apart from each of the first and second external electrodes within the body and connected to the noise removal unit, wherein the noise removal unit includes a wall portion disposed outside of an outermost side turn of the coil unit at the support substrate and surrounding the outermost side turn of the coil unit and a cover portion disposed on the coil unit.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Herein, a lower side, a lower portion, a lower surface, and the like, are used to refer to a direction toward a mounted surface of the fan-out semiconductor package in relation to cross sections of the drawings, while an upper side, an upper portion, an upper surface, and the like, are used to refer to an opposite direction to the direction. However, these directions are defined for convenience of explanation, and the claims are not particularly limited by the directions defined as described above.

The meaning of a “connection” of a component to another component in the description includes an indirect connection through an adhesive layer as well as a direct connection between two components. In addition, “electrically connected” means the concept including a physical connection and a physical disconnection. It can be understood that when an element is referred to with “first” and “second”, the element is not limited thereby. The terms “first,” “second,” etc. may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

The term “an exemplary embodiment” used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

Terms used herein are used only in order to describe an exemplary embodiment rather than limiting the present disclosure. In this case, singular forms include plural forms unless interpreted otherwise in context.

Various types of electronic components are used in electronic devices, and various types of coil components may be appropriately used between these electronic components to remove noise.

That is, in an electronic device, a coil component may be used as a power inductor, a high frequency (HF) inductor, a general bead, a high frequency bead (GHz bead), a common mode filter, and the like.

First Exemplary Embodiment

Figure 1:
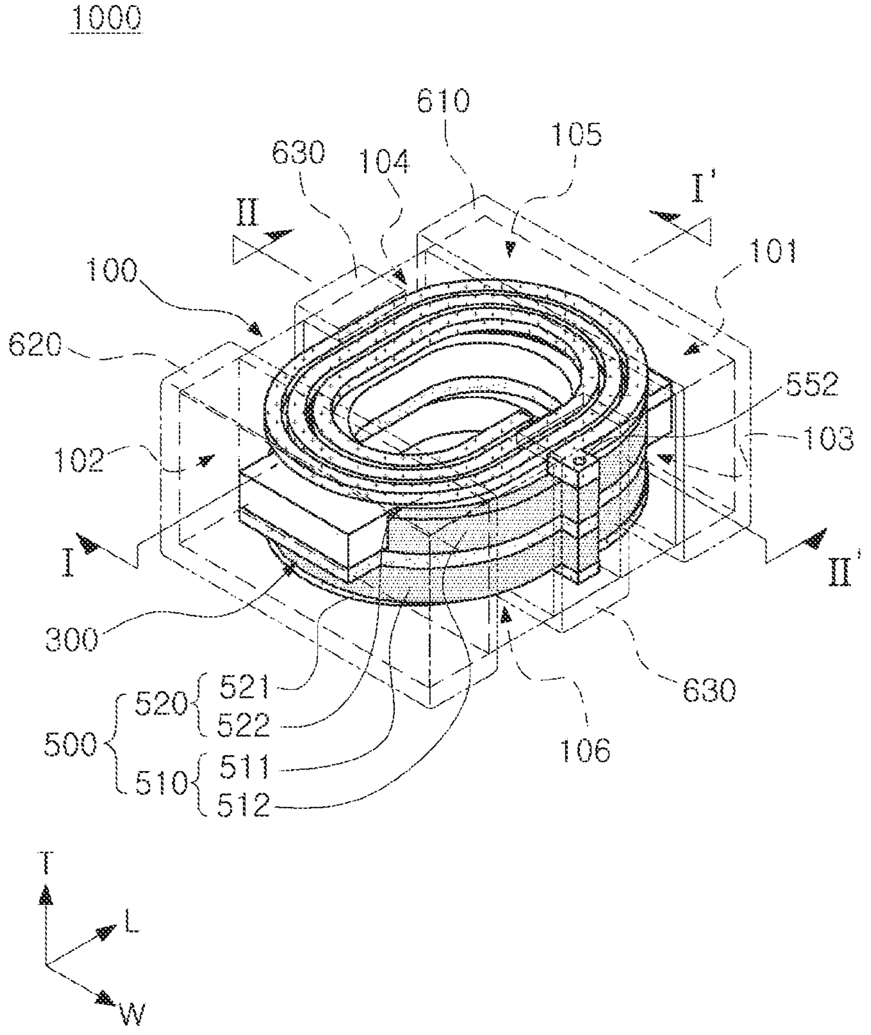
FIG. 1 is a view schematically showing a coil component according to a first exemplary embodiment in the present disclosure.
Figure 2:
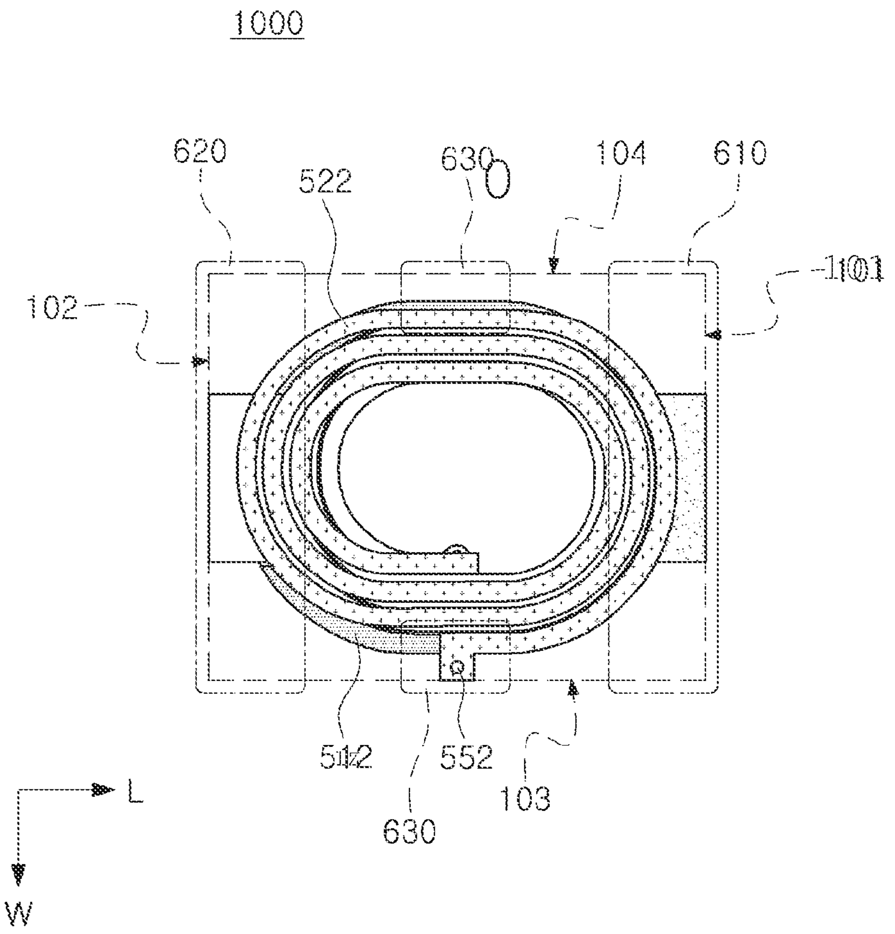
FIG. 2 is a top view of a coil component according to the first exemplary embodiment in the present disclosure.
Figure 3:
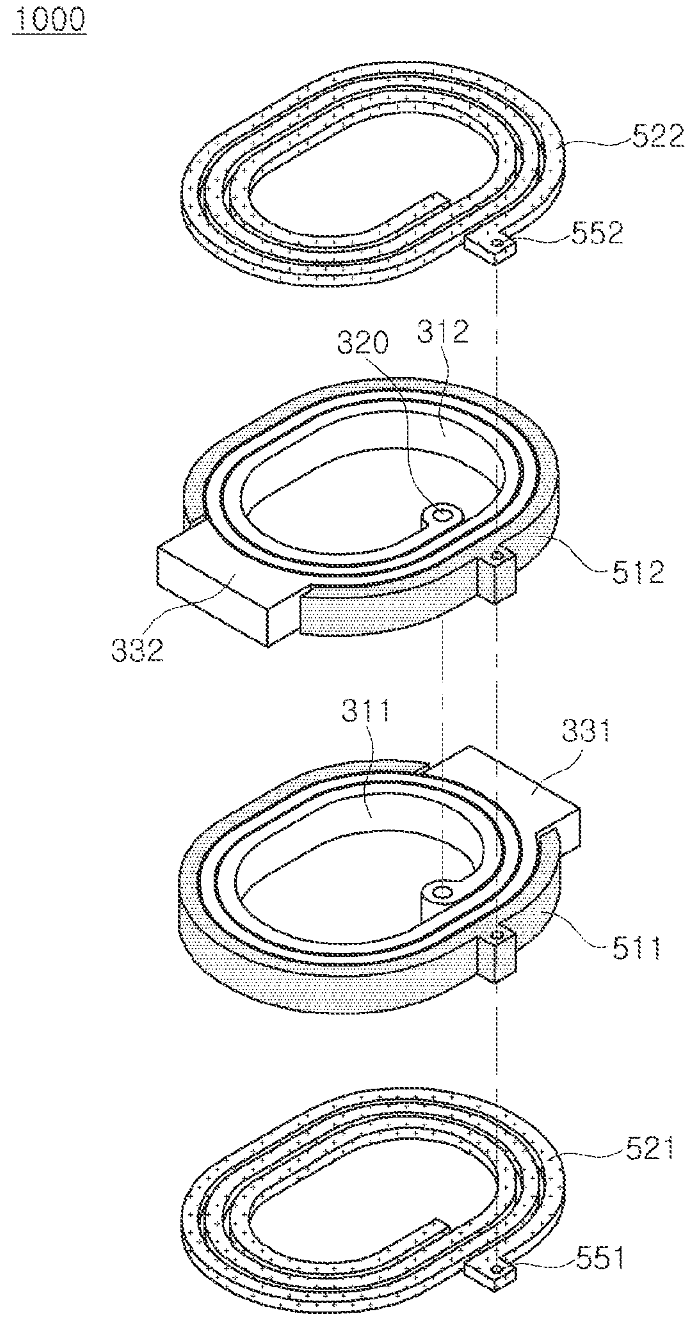
FIG. 3 is an exploded perspective view showing a structure of each layer of a coil component according to the first exemplary embodiment in the present disclosure.

FIG. 1 is a view schematically showing a coil component according to a first exemplary embodiment in the present disclosure. FIG. 2 is a top view of a coil component according to the first exemplary embodiment in the present disclosure. FIG. 3 is an exploded perspective view showing a structure of each layer of a coil component according to the first exemplary embodiment in the present disclosure. FIG.

Figure 5:
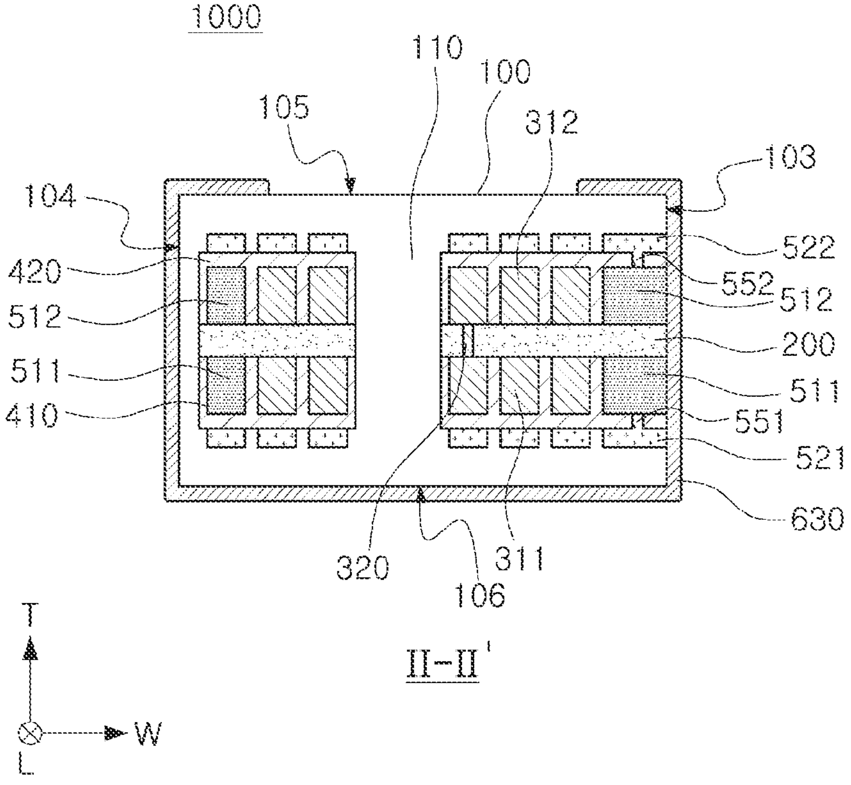
FIG. 5 is a cross-sectional view taken along line II-II' of FIG. 1.

4 is a cross-sectional view taken along line I-I' of FIG. 1. FIG. 5 is a cross-sectional view taken along line II-II' of FIG. 1.

Meanwhile, in FIGS. 1 to 3, insulating layers 410 and 420 applied to the present exemplary embodiment are omitted to more clearly show the coupling between different components.

Referring to FIGS. 1 through 5, a coil component 1000 according to a first exemplary embodiment in the present disclosure includes a body 100, a support substrate 200, a coil unit 300, insulating layers 410 and 420, a noise removal unit 500, and first to third external electrodes 610, 620, and 630.

The body 100 forms the exterior of the coil component 1000 according to the present exemplary embodiment and includes the coil unit 300 and the noise removal unit 500 embedded therein.

The body 100 may have a hexahedral shape as a whole.

In FIG. 1, the body 100 includes a first surface 101 and a second surface 102 facing each other in a length direction L, a third surface 103 and a fourth surface 104 facing each other in a width direction W, and a fifth surface 105 and a sixth surface 106 facing each other in a thickness direction T. Each of the first to fourth surfaces 101, 102, 103, and 104 of the body 100 corresponds to a wall surface of the body 100 that connects the fifth surface 105 and the sixth surface 106 of the body 100. Hereinafter, both end surfaces (of the body 100 may refer to the first surface 101 and the second surface 102 of the body and both side surfaces of the body 100 may refer to the third surface 103 and the fourth surface 104 of the body, respectively. Also, one surface and the other surface of the body 100 may refer to a sixth surface 106 and a fifth surface 105 of the body 100, respectively.

By way of example, the body 100 may be formed such that the coil component 1000 according to the present exemplary embodiment including external electrodes 610, 620, and 630 to be described later has a length of 2.0 mm, a width of 1.2 mm, and a thickness of 0.65 mm but is not limited thereto. Meanwhile, the aforementioned dimensions are merely design values that do not reflect process errors, etc., and thus, it should be appreciated that dimensions within a range admitted as a processor error fall within the scope of the present disclosure.

The body 100 may include a magnetic material and a resin. Specifically, the body 100 may be formed by stacking at least one magnetic composite sheet including a resin and a magnetic material dispersed in the resin. However, the body 100 may have a structure other than the structure in which a magnetic material is dispersed in a resin. For example, the body 100 may be formed of a magnetic material such as ferrite.

The magnetic material may be ferrite or a magnetic metal powder.

Ferrite powder may be at least one of, for example, spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

The magnetic metal powder may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder may be at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si alloy powder, Fe—Si—Cu—Nb-based alloy powder, Fe—Ni—Cr-based alloy powder, and Fe—Cr—Al-based alloy powder.

The magnetic metal powder may be amorphous or crystalline. For example, the magnetic metal powder may be Fe—Si—B—Cr-based amorphous alloy powder, but is not limited thereto.

Ferrite and the magnetic metal powder may each have an average diameter of about 0.1 μm to 30 μm, but are not limited thereto.

The body 100 may include two or more types of magnetic materials dispersed in a resin. Here, the different types of magnetic materials refer to that magnetic materials dispersed in a resin are distinguished from each other by at least one of an average diameter, a composition, crystallinity, and a shape.

The resin may include, but is not limited to, epoxy, polyimide, liquid crystal polymer, or the like alone or as a mixture.

The body 100 includes a core 110 penetrating the coil unit 300 and a support substrate 200. The core 110 may be formed by filling a through hole of the coil unit 300 with the magnetic composite sheet, but is not limited thereto.

The support substrate 200 is embedded within the body 100. The support substrate 200 supports the coil unit 300 and the noise removal unit 500 to be described later.

The support substrate 200 may be formed of an insulating material including a thermosetting insulating resin such as an epoxy resin, a thermoplastic insulating resin such as polyimide, or a photosensitive insulating resin or may be formed of an insulating material including such an insulating resin and a reinforcing material such as glass fiber or inorganic filler. As an example, the support substrate 200 may be formed of insulating materials such as prepreg, Ajinomoto build-up film (ABF), FR-4, a bismaleimide triazine (BT) resin, photo imageable dielectric (PID), copper clad laminate (CCL), etc., but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 200 is formed of an insulating material including a reinforcing material, the support substrate 200 may provide more excellent rigidity. If the support substrate 200 is formed of an insulating material that does not contain glass fibers, the support substrate 200 is advantageous in reducing a thickness of the coil unit 300 overall.

The coil unit 300 is embedded within the body 100 to manifest the characteristics of the coil component. For example, when the coil component 1000 of the present exemplary embodiment is used as a power inductor, the coil unit 300 may serve to stabilize power of an electronic device by storing an electric field as a magnetic field and maintaining an output voltage.

The coil unit 300 is formed on at least one of both surfaces of the support substrate 200 and forms at least one turn. In this exemplary embodiment, the coil unit 300 includes first and second coil patterns 311 and 312 respectively formed on both surfaces of the support substrate 200 facing each other in the thickness direction T of the body 100, a via 320 penetrating the support substrate 200 to connect the first and second coil patterns 311 and 312, and first and second lead patterns 331 and 332 exposed to the first and second surfaces 101 and 102 of the body 100, respectively.

Each of the first coil pattern 311 and the second coil pattern 312 may have a shape of a flat spiral in which at least one turn is formed around the core 110. For example, based on the direction of FIG. 1, the first coil pattern 311 may form at least one turn around the core 110 on the lower surface of the support substrate 200, and the second coil pattern 312 may form at least one turn around the core 110 on the upper surface of the support substrate 200.

Via 320 is connected to an inner end of each of the first coil pattern 311 and the second coil pattern 312 through the support substrate 200.

Ends of the first and second coil patterns 311 and 312 are connected to the first and second lead patterns 331 and 332, respectively, and the first and second lead patterns 331 and 332 are connected to the first and second external electrodes 610 and 620 to be described later. That is, as an example, the first lead pattern 331 extends from the first coil pattern 311 on a first surface of the support substrate 200 and is exposed to the first surface 101 of the body 100, and the second lead pattern 332 extends from the second coil pattern 312 on a second surface of the support substrate 200 and is exposed to the second surface 102 of the body 100, so as to be in contact with and connected to the first and second external electrodes 610 and 620 formed to be spaced apart from each other on the first and second surfaces 101 and 102 of the body 100, respectively. Accordingly, the coil unit 300 may function as a single coil as a whole between the first and second external electrodes 610 and 620.

At least one of the coil patterns 311 and 312, the lead patterns 331 and 332, and the via 320 may include at least one conductive layer.

As an example, when the second coil pattern 312, the second lead pattern 332, and the via 320 are formed by plating on the other surface side of the support substrate 200, the second coil pattern 312, the second lead pattern 332, and the via 320 may each include a seed layer and an electroplating layer. The seed layer may be formed by an electroless plating method or a vapor deposition method such as sputtering or the like. Each of the seed layer and the electroplating layer may have a single layer structure or a multilayer structure. The multilayer electroplating layer may be formed in a conformal film structure in which another electroplating layer covers any one electroplating layer or may be formed in a shape in which another electroplating layer is stacked only on one surface of any one electroplating layer. The seed layer of the second coil pattern 312, the seed layer of the second lead pattern 332, and the seed layer of the via 320 may be formed integrally so that a boundary may not be formed therebetween, but is not limited thereto. The electroplating layer of the second coil pattern 312, the electroplating layer of the second lead pattern 332, and the electroplating layer of the via 320 may be integrally formed so that a boundary may not be formed therebetween, but is not limited thereto.

As another example, based on the direction of FIG. 1, when the coil unit 300 is formed by separately forming the first coil pattern 311 disposed a first surface of the support substrate 200 and the second coil pattern 312 disposed on a second surface of the support substrate 200 and subsequently collectively stacking the first coil pattern 311 and the second coil pattern 312 on the support substrate 200, the via 320 may include a high melting point metal layer and a low melting point metal layer having a melting point lower than that of the high melting point metal layer. Here, the low melting point metal layer may be formed of solder including lead (Pb) and/or tin (Sn). At least a part of the low melting point metal layer may be melted due to pressure and temperature in the collectively stacking. Accordingly, an intermetallic compound (IMC) layer may be formed on at least a part of a boundary between the low melting point metal layer and the second coil pattern 312 and a boundary between the low melting point metal layer and the high melting point metal layer.

The coil patterns 311 and 312 may be formed to protrude from the first surface and the second surface of the support substrate 200, respectively, based on the direction of FIG. 1, for example. As another example, based on the direction of FIG. 1, the first coil pattern 311 may be formed to protrude from the first surface of the support substrate 200 and the second coil pattern 312 may be embedded in the support substrate 200 and an upper surface thereof may be exposed to the second surface of the support substrate 200. In this case, a concave portion may be formed on the upper surface of the second coil pattern 312 so that the other surface of the support substrate 200 and the upper surface of the second coil pattern 312 may not be coplanar. As another example, based on the direction of FIG. 1, the second coil pattern 312 may be formed to protrude from the other surface of the support substrate 200 and the first coil pattern 311 may be embedded in the other surface of the support substrate 200 but a lower surface thereof may be exposed to the first surface of the support substrate 200. In this case, a concave portion may be formed on the lower surface of the first coil pattern 311, so that the first surface of the support substrate 200 and the lower surface of the first coil pattern 311 may not be coplanar.

The coil patterns 311 and 312, the lead patterns 331 and 332, and the via 320 may each be formed of a conductive material such as copper (Cu), aluminum (Al), silver (Ag), tin (Sn), gold (Au), nickel (Ni), lead (Pb), titanium (Ti), or an alloy thereof, but is not limited thereto.

The noise removal unit 500 is disposed within the body 100 to discharge noise transmitted to the component and/or noise occurring at the component to a mounting board or the like. Specifically, the noise removal unit 400 is disposed on the support substrate 200 embedded within the body 100 and spaced apart from the coil unit 300 by the insulating layers 410 and 420, and an end thereof is exposed to one side surface of the body 100.

The noise removal unit 500 may include a wall portion 510, a cover portion 520, and outer vias 551 and 552.

The wall portion 510 may be disposed outside the outermost turn of the coil unit 300 and surround the outermost turn of the coil unit 300. Further, the wall portion 510 may include a first noise removal pattern 511 and a second noise removal pattern 512.

Specifically, referring to FIG. 3, the first noise removal pattern 511 may be disposed along a circumference of the outermost turn of the first coil pattern 311 on the lower surface of the support substrate 200. Portions of the first noise removal pattern 511 that meet the first lead pattern 331 may be open to form an open loop.

In addition, the second noise removal pattern 512 may be disposed along a circumference of the outermost turn of the second coil pattern 312 on the upper surface of the support substrate 200. Accordingly, the wall portion 510 may be coplanar with the coil unit 300. Portions of the second noise removal pattern 512 that meet the second lead pattern 332 may be open to form an open loop.

In this way, since each of the noise removal patterns 511 and 512 form the open loop, electric energy stored as the noise removal unit 500 is capacitively coupled with the coil unit 300 may be easily discharged to a ground through an end, rather than staying in the noise removal unit 500.

The cover portion 520 may be disposed on the coil unit 300. In addition, the cover portion 520 may include a third noise removal pattern 521 and a fourth noise removal pattern 522.

Specifically, referring to FIG. 3, the third noise removal pattern 521 may be disposed on the first coil pattern 311 on the lower surface of the support substrate 200. In addition, the fourth noise removal pattern 522 may be disposed on the second coil pattern 312 on the upper surface of the support substrate 200. However, referring to FIGS. 4 and 5, a first insulating layer 410 to be described later may be interposed between the first coil pattern 311 and the third noise removal pattern 521. In addition, a second insulating layer 420 to be described later may be interposed between the second coil pattern 312 and the fourth noise removal pattern 522.

Here, the third noise removal pattern 521 and the fourth noise removal pattern 522 may each have a planar spiral shape having at least one turn and may have the same winding direction as those of the first and second coil patterns 311 and 312, respectively. That is, since the third noise removal pattern 521 and the fourth noise removal pattern 522 have the coil shape corresponding to that of the coil patterns 311 and 312, efficiency of removing noise due to capacitive coupling between the coil patterns 311 and 312 and the third and fourth noise removal patterns 521 and 522 may further increase.

The outer vias 551 and 552 may connect the wall portion 510 and the cover portion 520 to each other through the insulating layers 410 and 420. Specifically, referring to FIG. 6, the first outer via 551 may connect the first noise removal pattern 511 and the third noise removal pattern 521 to each other through the first insulating layer 410. In addition, the second outer via 552 may connect the second noise removal pattern 512 and the fourth noise removal pattern 522 to each other through the second insulating layer 420.

In this way, by connecting the first and third noise removal patterns 511 and 521 to each other and by connecting the second and fourth noise removal patterns 512 and 522 to each other, an overall available capacity enabling removal of noise due to capacitive coupling at the noise removal unit 500 may increase. In addition, efficiency of removing electromagnetic interference (EMI) noise may increase by accumulating electromagnetic waves radiated in each direction, in both vertical and horizontal directions.

An end of the noise removal unit 500 is exposed to the third surface 103, which is a surface of the body 100. The end of the noise removal unit 500 may be in contact with and connected to a third external electrode 630 to be described later disposed on the third surface 103 of the body 100. Specifically, in the case of this exemplary embodiment, the ends of the first to fourth noise removal patterns 511, 512, 521, and 522 are exposed to one side surface of the body 100, that is, the third surface 103, so as to be connected to the third external electrode 630. The third external electrode 630 may be connected to a ground of a mounting board when the coil component 1000 according to the present exemplary embodiment is mounted on the mounting board, or the third external electrode 630 may be connected to a ground of an electronic component package when the coil component 1000 according to the present exemplary embodiment is packaged in the electronic component package.

Each of the noise removal patterns 511, 512, 521, and 522 and the outer vias 551 and 552 may be formed of a conductive material such as copper (Cu), aluminum (Al), silver (Ag), tin (Sn), gold (Au), nickel (Ni), lead (Pb), titanium (Ti), or an alloy thereof, but is not limited thereto.

It may be formed by a method including at least one of a vapor deposition method and an etching method such as electro-magnetic interference (EMI), an electroless plating method, an electroplating method, and sputtering, but is not limited thereto.

Figure 4:
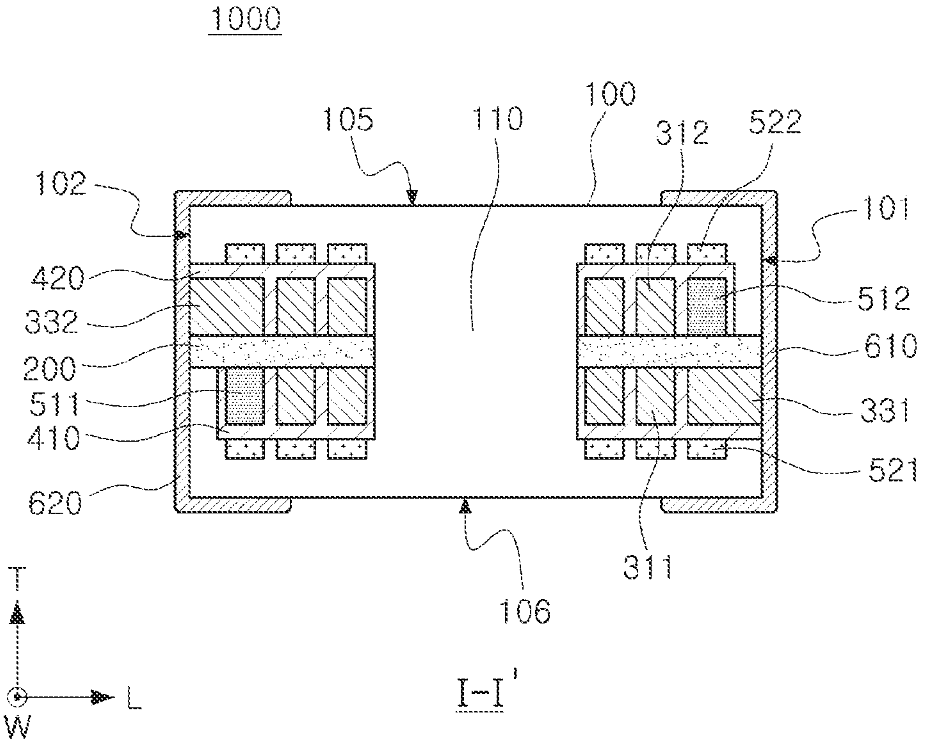
FIG. 4 is a cross-sectional view taken along line I-I' of FIG. 1.

The insulating layers 410 and 420 are disposed between the coil unit 300 and the cover portion 520. For example, as shown in FIGS. 4 and 5, in the present exemplary embodiment, the first insulating layer 410 may be disposed on the first coil pattern 311 and may be disposed between the first coil pattern 311 and the third noise removal pattern 521. Also, the first coil pattern 311 and the first noise removal pattern 511 may be insulated by the first insulating layer 410.

The second insulating layer 420 may be disposed on the second coil pattern 312 and may be disposed between the second coil pattern 312 and the fourth noise removal pattern 522. Also, the second coil pattern 312 and the second noise removal pattern 512 may be insulated by the second insulating layer 420.

The insulating layers 410 and 420 may be formed by stacking insulating films on both surfaces of the support substrate 200 on which the coil unit 300 is disposed, respectively. The insulating film may be a general non-photosensitive insulating film such as Ajinomoto build-up film (ABF) or a prepreg, or a photosensitive insulating film such as a dry film or PID. The insulating layers 410 and 420 function as dielectric layers when the coil patterns 311 and 312 of the coil unit 300 and the noise removal patterns 511, 512, 521, and 522 of the noise removal unit 500 are capacitively coupled to each other.

The first and second external electrodes 610 and 620 are disposed on the first and second surfaces 101 and 102 of the body 100 and connected to the first and second coil patterns 311 and 312, respectively. That is, the first external electrode 610 is disposed on the first surface 101 of the body 100 and is in contact with and connected to the first lead pattern 331 exposed to the first surface 101 of the body 100. The second external electrode 620 is disposed on the second surface 102 of the body 100 and is in contact with and connected to the end of the second lead pattern 332 exposed to the second surface 102 of the body 100. The first and second external electrodes 610 and 620 may be formed to extend from the first and second surfaces 101 and 102 of the body 100 to the sixth surface of the body 100, respectively. In addition, the first and second external electrodes 610 and 620 may extend from the first and second surfaces 101 and 102 of the body 100 to portions of the third, fourth, and fifth surfaces 103, 104, and 105 of the body 100, respectively. However, since the shapes of the first and second external electrodes 610 and 620 shown in FIG. 1 and the like are exemplary only, each of the external electrodes 610 and 620 may not extend to portions of the third, fourth, and fifth surfaces 103, 104, and 105 of the body 100. In other words, each of the external electrodes 610 and 620 may be variously modified to an L-shape or the like.

When the coil component 1000 according to the present exemplary embodiment is mounted on a mounting board such as a PCB or the like, the first and second external electrodes 610 and 620 electrically connect the coil component 1000 to the mounting board. As an example, the coil component 1000 according to the present exemplary embodiment may be mounted such that the sixth surface 106 of the body 100 faces an upper surface of the PCB and the first and second external electrodes 610 and 620 extending to the sixth surface 106 of the body 100 and a connection portion of the PCB may be electrically connected by a conductive coupling member such as a solder or the like.

The third external electrode 630 may include a pad portion disposed on the sixth surface 106 of the body 100 so as to be spaced apart from the first and second external electrodes 610 and 620 and a side surface portion disposed on at least one of the third surface 103 or the fourth surface 104 of the body 100.

The pad portion may be formed on the sixth surface 106 of the body 100. For example, as shown in FIG. 5, the pad portion may be formed to have a length corresponding to a length of the sixth surface 106 of the body 100 according to the width direction W of the body 100. However, the scope of the present disclosure is not limited to the above description.

The side surface portion may be formed on the third surface 103 and/or the fourth surface 104 of the body 100. As an example, the side surface portion may be formed on each of the third surface 103 and the fourth surface 104 of the body 100 as shown in FIG. 5. As an example, as shown in FIG. 1, the side surface portion has a length corresponding to a length of the third surface 103 and the fourth surface 104 of the body 100 according to the thickness direction T of the body 100. In addition, at least a portion of the side surface portion may extend to the fifth surface 105 of the body 100. However, the scope of the present disclosure is not limited to the above description.

Further, the pad portion and the side surface portion of the third external electrode 630 may be integrally formed with each other. That is, the pad portion and the side surface portion may be formed together during the same process.

The third external electrode 630 may be connected to a ground of a mounting board when the coil component 1000 according to the present exemplary embodiment is mounted on the mounting board, or may be connected to a ground of an electronic component package when the coil component 1000 according to the present exemplary embodiment is packaged in the electronic component package. Through this, the third external electrode 630 may transmit electric energy accumulated in the noise removal unit 500 to the mounting board and discharge the electric energy to the ground, thereby reducing electromagnetic interference (EMI) noise.

The first to third external electrodes 610, 620, and 630 may include at least one of a conductive resin layer and an electroplating layer. The conductive resin layer may be formed by paste printing or the like and may include any one or more of conductive metals selected from the group consisting of copper (Cu), nickel (Ni), and silver (Ag), and a thermosetting resin. The electroplating layer may include at least one selected from the group consisting of nickel (Ni), copper (Cu), and tin (Sn).

Second Exemplary Embodiment

Figure 6:
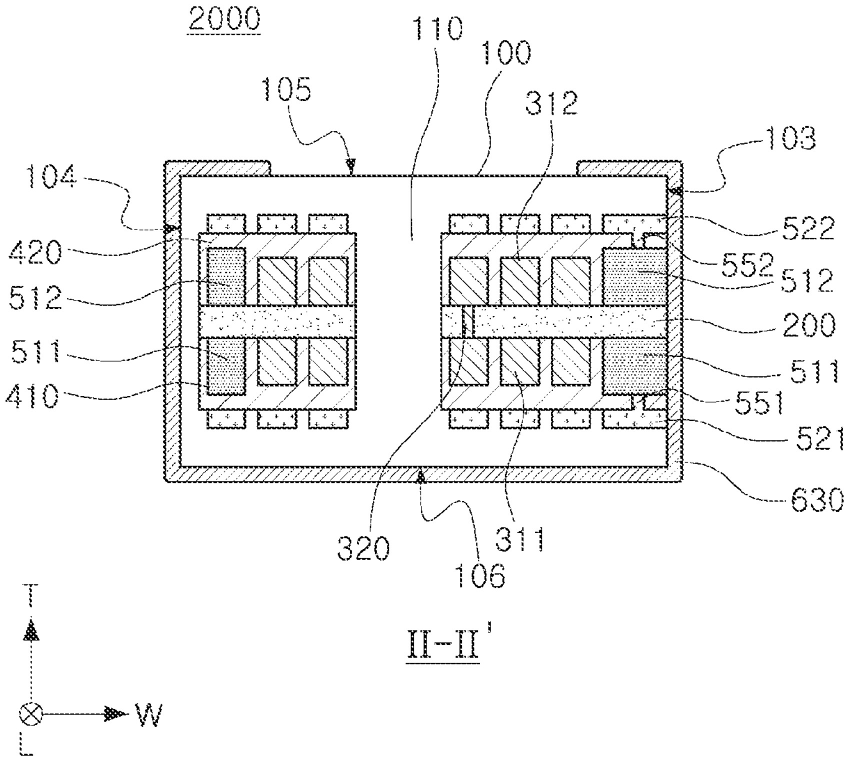
FIG. 6 is a cross-sectional view taken along line II-II' of a second exemplary embodiment.

FIG. 6 is a cross-sectional view taken along line II-II' of a second exemplary embodiment.

Referring to FIG. 6, in a coil component 2000 according to the present exemplary embodiment, a thickness of the coil patterns 311 and 312, and a thickness of the first and second noise removal patterns 511 and 512 are different, when compared to the coil component 1000 according to the first exemplary embodiment in the present disclosure. Therefore, in describing this exemplary embodiment, only the thickness of the coil patterns 311 and 312 and the thickness of the first and second noise removal patterns 511 and 512 different from the first exemplary embodiment in the present disclosure will be described. For other components of the present exemplary embodiment, the descriptions of the first exemplary embodiment in the present disclosure may be applied as it is.

Referring to FIG. 6, since the thickness in this exemplary embodiment refers to a length in the thickness direction T with respect to the direction of FIG. 6, a length from the lower surface of the support substrate 200 to a maximum height of the first noise removal pattern 511 may be defined as a thickness of the first noise removal pattern 511. Similarly, a thickness of the first coil pattern 311 may be defined as a length from the lower surface of the support substrate 200 to a maximum height of the first coil pattern 311.

In addition, a length from the lower surface of the support substrate 200 to a maximum height of the second noise removal pattern 512 may be defined as a thickness of the second noise removal pattern 512. Similarly, a thickness of the second coil pattern 312 may be defined as a length from the lower surface of the support substrate 200 to a maximum height of the second coil pattern 312.

In this exemplary embodiment, the thickness of the first noise removal pattern 511 from the lower surface of the support substrate 200 may be formed to be greater than the thickness of the first coil pattern 311. In addition, the thickness of the second noise removal pattern 512 from the upper surface of the support substrate may be greater than the thickness of the second coil pattern 312.

In this case, when compared to the coil component 1000 of the first exemplary embodiment, the area of portions where the first and second noise removal patterns 511 and 512 are connected to the third external electrode 630 may be increased, thus obtaining an effect of removing a larger amount of noise more quickly.

As set forth above, according to exemplary embodiments in the present disclosure, noise may be easily removed from the coil component and efficiency of noise removal of the coil component may be increased.

While exemplary embodiments have been shown and described above, it will be apparent to those skilled in the art that modifications and variations could be made without departing from the scope of the present disclosure as defined by the appended claims.

What is claimed is:

1. A coil component comprising:

a body;

a support substrate disposed within the body;

a coil unit disposed on the support substrate;

a noise removal unit disposed within the body and arranged spaced apart from the coil unit;

first and second external electrodes disposed to be spaced apart from each other at the body and connected to both ends of the coil unit; and a third external electrode disposed to be spaced apart from each of the first and second external electrodes within the body and connected to the noise removal unit, wherein the noise removal unit includes a wall portion disposed outside of an outermost side turn of the coil unit at the support substrate and surrounding the outermost side turn of the coil unit, and a cover portion disposed on the coil unit, and wherein the wall portion extends to reach an external surface of the body.

2. The coil component of claim 1, wherein the body has a first side surface and a second side surface facing each other, a first surface and a second surface connecting the first side surface and the second side surface of the body, respectively, and facing each other, and a first end surface and a second end surface connecting the first surface and the second surface of the body and facing each other, and the coil unit includes first and second coil patterns disposed on a lower surface and an upper surface of the support substrate, respectively, first and second lead patterns connected to the first and second coil patterns and exposed to the first end surface and the second end surface of the body, respectively, and a via connecting the first and second coil patterns through the support substrate.

3. The coil component of claim 2, wherein the wall portion includes a first noise removal pattern disposed along a circumference of an outermost turn of the first coil pattern on the lower surface of the support substrate and a second noise removal pattern disposed along a circumference of an outermost turn of the second coil pattern on the upper surface of the support substrate, and the cover portion includes a third noise removal pattern disposed on the first coil pattern on the lower surface of the support substrate and a fourth noise removal pattern disposed on the second coil pattern on the upper surface of the support substrate.

4. The coil component of claim 3, further comprising:

a first insulating layer disposed between the first coil pattern and the third noise removal pattern; and a second insulating layer disposed between the second coil pattern and the fourth noise removal pattern.

5. The coil component of claim 4, wherein the noise removal unit further includes a first outer via connecting the first and third noise removal patterns through the first insulating layer and a second outer via connecting the second and fourth noise removal patterns through the second insulating layer.

6. The coil component of claim 3, wherein a portion of the first noise removal pattern adjacent the first lead pattern is open to form an open loop and a portion of the second noise removal pattern adjacent the second lead pattern is open to form an open loop.

7. The coil component of claim 3, wherein each of the third and fourth noise removal patterns has a planar spiral shape having at least one turn and has the same winding direction as the first and second coil patterns.

8. The coil component of claim 3, wherein an end of each of the first to fourth noise removal patterns is exposed to one side surface of the body.

9. The coil component of claim 3, wherein a thickness of the first noise removal pattern is greater than a thickness of the first coil pattern on a lower surface of the support substrate, and a thickness of the second noise removal pattern is greater than a thickness of the second coil pattern on an upper surface of the support substrate.

10. The coil component of claim 1, wherein the noise removal unit includes copper (Cu).

11. A coil component, comprising:

a coil pattern disposed on a support substrate and having a plurality of turns;

a noise removal unit comprising:

a wall portion disposed outside and surrounding an outermost turn of the coil pattern, and having at least one turn, and a cover portion disposed on the coil pattern;

a body encapsulating the coil pattern, the support substrate and the noise removal unit, the body having a pair of end surfaces and a pair of side surfaces each connecting the pair of end surfaces;

first and second external electrodes disposed on an opposing pair of end surfaces of the body, and connected to a corresponding end of the coil pattern; and a third external electrode disposed on one of the pair of the side surfaces and connected to the noise removal unit, wherein the wall portion extends to reach an external surface of the body.

12. The coil component of claim 11, wherein the cover portion and the wall portion are spaced apart from the coil pattern by an insulating layer.

13. The coil component of claim 11, wherein the coil pattern comprises a pair of lead portions connecting the coil pattern to corresponding of the first and second external electrodes.

14. The coil component of claim 13, wherein the wall portion forms an open loop around the coil pattern such that the wall portion is open at the pair of lead portions.

15. The coil component of claim 11, wherein the cover portion comprises a plurality of turns such that each of the plurality of turns of the cover portion is disposed on a corresponding of the plurality of turns of the coil pattern.

16. The coil component of claim 11, wherein the cover portion and the wall portion have ends extending away from a center of the coil pattern towards a side surface of the body on which the third external electrode is disposed so as to connect the cover portion and the wall portion to the third external electrode.

17. A coil component, comprising:

a coil pattern disposed on a support substrate and having a plurality of turns;

a noise removal unit comprising:

a wall portion disposed outside and surrounding an outermost turn of the coil pattern, and having at least one turn, and a cover portion disposed on the coil pattern;

a body encapsulating the coil pattern, the support substrate and the noise removal unit, the body having a pair of end surfaces and a pair of side surfaces each connecting the pair of end surfaces;

first and second external electrodes disposed on an opposing pair of end surfaces of the body, and connected to a corresponding end of the coil pattern; and a third external electrode disposed on one of the pair of the side surfaces and connected to the noise removal unit, wherein the cover portion and the wall portion have ends extending away from a center of the coil pattern towards a side surface of the body on which the third external electrode is disposed so as to connect the cover portion and the wall portion to the third external electrode.

* * * * *